Aug. 4, 1931.  A. N. SPANEL  1,817,532
TREATING MEANS FOR FABRICS
Filed April 18, 1928  3 Sheets-Sheet 1
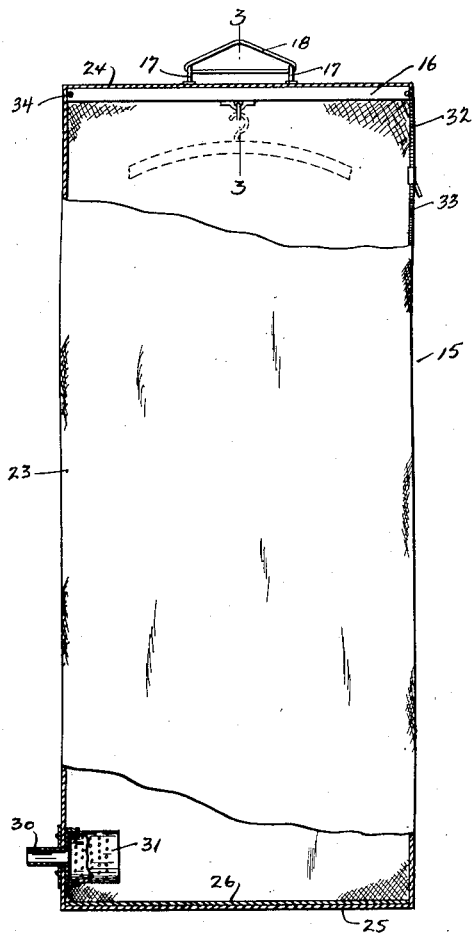
Fig. 1.
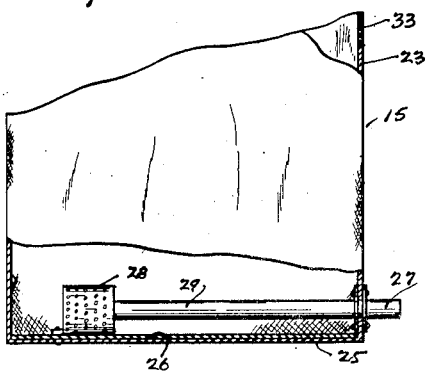
Fig. 10.
INVENTOR
Abraham N. Spanel
By
J. W. Ellis
ATTORNEY

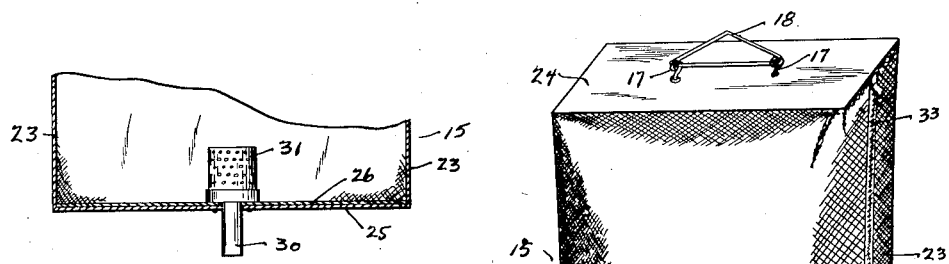
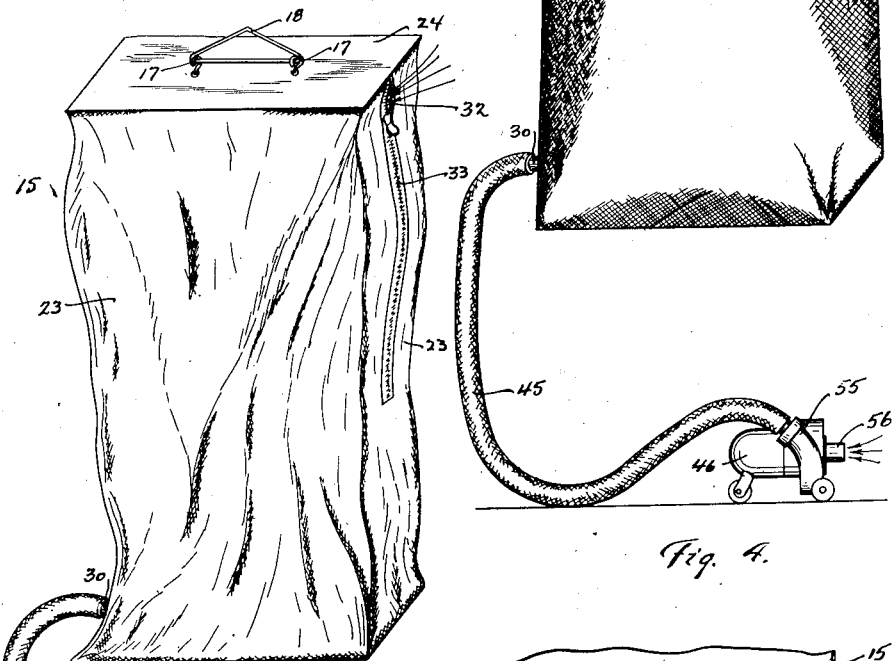
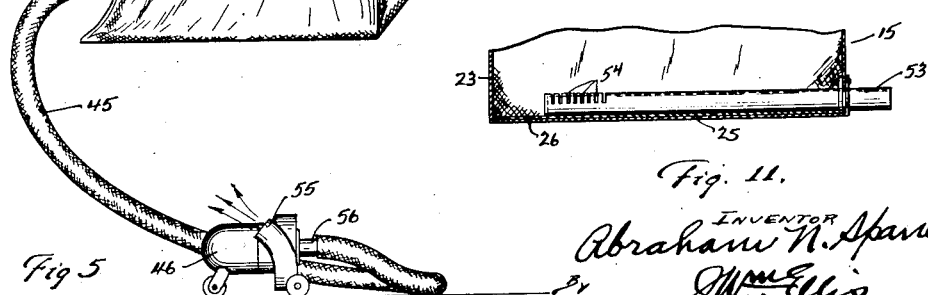
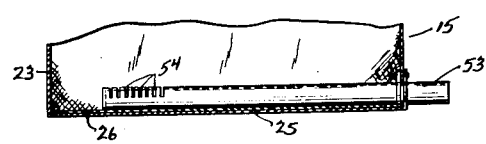

Aug. 4, 1931.   A. N. SPANEL   1,817,532
TREATING MEANS FOR FABRICS
Filed April 18, 1928   3 Sheets-Sheet 3

INVENTOR
Abraham N. Spanel
By J. W. Ellis
ATTORNEY

Patented Aug. 4, 1931

1,817,532

UNITED STATES PATENT OFFICE

ABRAHAM N. SPANEL, OF ROCHESTER, NEW YORK

TREATING MEANS FOR FABRICS

Application filed April 18, 1928. Serial No. 271,001.

My invention relates in general to means for treating articles, such as clothing, bedding, furs, woolens, and the like, and in particular to means by which the articles can be subjected to the gases, vapors, or particles of a volatile substance, for the purpose of fumigating, disinfecting, exterminating moths, or rendering articles moth-proof.

It is well known to those skilled in the art that in the extermination of insect life, either in the fully developed form or in the larva stage, the exterminating agent is much more effective when used under a pressure above that of the atmosphere.

The principal object of my invention has been, therefore, to provide means whereby the articles being treated, may be subjected not only to vapors, gases, or particles of a chemical agent, but to gases or vapors while under pressure.

Another object has been to provide means by which the odors of the volatile substance employed may be removed from the articles, after they have been fumigated or disinfected.

Moreover, it has been an object to provide my means with a relatively large opening through which objects may be easily and quickly inserted.

My invention is provided with means for quickly closing the opening thereof.

The above objects and advantages have been accomplished by the device shown in the accompanying drawings, of which:

Fig. 1 is a front elevation, partly in section, of the preferred form of my invention.

Fig. 2 is a side elevation thereof.

Fig. 3 is an enlarged fragmentary, sectional view, taken on line 3—3 of Fig. 1.

Fig. 4 is a front elevation of my device showing it in use.

Fig. 5 is a similar view also showing my device in use during another stage of its operation.

Figure 7:
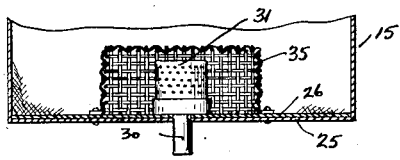
Figure 8:
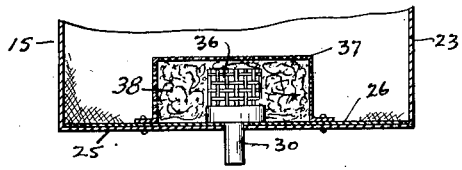

Figs. 6 to 8, inclusive, show fragmentary views of modified forms of my invention with the hose connector at the bottom.

Figure 9:
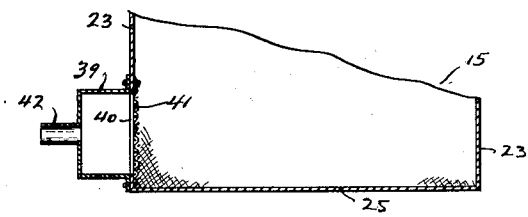

Fig. 9 is another modification of my invention and shows a chemical container on the outside of the receptacle.

Fig. 10 shows a fragmentary, sectional view of a modified form where the connector is on the same side as the receptacle opening.

Fig. 11 is a similar view of a similar modification.

Figure 12:
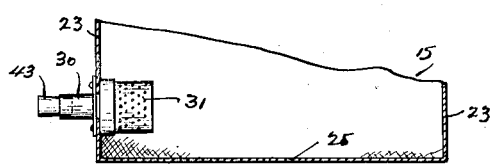

Fig. 12 shows the use of a stopper in the hose connector during one stage of use of my device.

Figure 13:
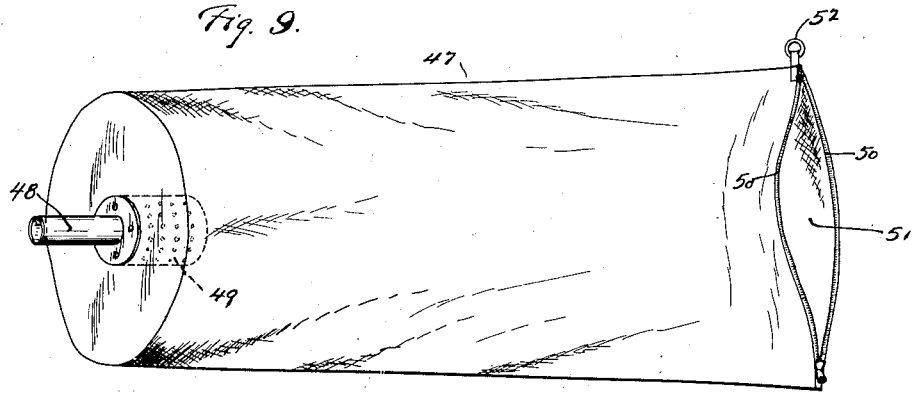

Fig. 13 is another modification of my invention in which I show a different shaped receptacle.

Referring now to the form of invention shown in Figs. 1 to 4, inclusive, my device comprises a receptacle 15 made of flexible or collapsible material, and preferably non-porous. The material from which this receptacle is made may be rubberized fabric or the like. In the top of the receptacle is preferably provided a central bar 16 which supports a metallic wire frame 34. The metallic wire frame is substantially of the same shape as the cross-section of the receptacle and thus forms a suitable support for the receptacle, whereby its sides 23 will hang freely suspended. A plurality of hooks 17 are arranged at the top of the receptacle and pass into the central strip 16, through which a rope or other flexible supporting member 18 may be passed. A wire support 19 is arranged in the top of the receptacle and preferably extends crosswise of the width of the receptacle. This support is secured at its central portion 20 to the central bar 16, and its ends 21 extend upwardly and are secured to the wire frame 34. The support is formed with a plurality of bent portions 22 which provide spaced supports for garment hangers, one of which is shown by dotted lines in Fig. 1.

The receptacle 15 is provided with a top 24 and with a bottom 25. The sides 23 are preferably secured to the top and bottom by being stitched or otherwise secured so as to provide substantially air-tight joints.

If desired the receptacle may be provided in its bottom with a rigid plate 26 which is supported by the bottom 25. This plate serves to keep the walls near the bottom of the receptacle separated which somewhat facilitates the use of the device.

Arranged near the bottom one of the walls of the device is a connector 30 as shown in Figs. 1 to 5. Obviously, the connector may be located in the bottom 25 of the receptacle, as shown in the modification of Fig. 6. This connector is preferably tubular in form and extends through the wall 23 of the receptacle and preferably carries at its inner end an apertured container 31. This container may be screw-threaded to the connector 24, whereby it may be detached from the connector from the inside of the receptacle. It will act as an apertured separator to prevent articles being treated within the device from clogging the opening in the connector when suction is being applied to the receptacle. The container 31 may also be used to receive the volatile substance which is used in my device when articles are being fumigated or disinfected.

It is obvious that since the opening in the connector 30 is in communication with the interior of the container 31, the volatile substance may be inserted into the container through the connector and from the outside of the receptacle. It may also be removed in the same manner. This is particularly advantageous when my device is being used to moth-proof or fumigate, since in many cases, it is desirable to remove the chemical agent while allowing the fumes to remain in the receptacle. In such cases it will be seen that the fumes contained within the receptacle will not be dissipated nearly so much as would be the case if the receptacle had to be opened.

The receptacle is provided in one of its sides 23 with an opening 32 through which articles to be treated may be inserted. This opening extends down the side for a considerable distance, and is of such a length as to make it easy to insert articles in the receptacle. Any suitable means may be employed to close the opening 32, but I prefer to use a hookless fastener 33.

In some cases it may be desirable to use the container 31 for the volatile substance, and to provide, in addition thereto, an apertured separator 35, as shown in Fig. 7. As here shown the container 31 is the same as that described in the previous forms, and the apertured separator 35 is shown as made of wire gauze. This separator is larger than the container 31 and is disposed about the container and in interspaced relation therewith. The separator is secured to the bottom 25 of the receptacle or to the bottom plate 26 thereof in any suitable manner. While I have shown the separator 35 as constructed of wire gauze, it is obvious that it may be made of perforated sheet metal, as shown in Fig. 8, the one requirement being that it shall be apertured.

In Fig. 8, in addition to the sheet metal separator 35 above referred to, I show another modification in which the container 36 for the volatile substance is made of wire gauze instead of being perforated sheet metal as in the other forms. Also shown in this view is a suitable filtering means 38 which is arranged between the container 36 and the apertured separator 37. This filtering means may be of mineral wool or other suitable material, and will serve to filter the air of any entrained dirt when the blower side of a vacuum cleaner is being used, as hereinafter referred to. Filtering material may be placed within the container 31 and the apertured separator 35 used in connection therewith or dispensed with, as desired.

Instead of providing the volatile substance container on the inside of the receptacle 15, it is obvious that they may be placed on the outside of the receptacle. Such a modification is shown in Fig. 9 where the container is represented by the numeral 39. The container is secured to a relatively large opening 40 formed in the side 23 of the receptacle, over which opening is preferably secured a wire screen 41 or perforated plate. The container 39 is provided with a suitable connector 42. The container here shown may be used as an apertured separator or a container for the volatile substance, or if desired an additional apertured separator may be provided within the receptacle.

Where it is desired to have the connector 30 on the same side of the receptacle as the opening 32, while maintaining the diagonal arrangement of ingress and egress of air from the inner end of the connector, the connector 27 shown in Fig. 10 may be extended inwardly across the bottom of the receptacle, having a container 28 arranged on the inner end 29 thereof. A similar construction is shown in Fig. 11 when the connector 53 is arranged on the same side of the receptacle as the opening. The inner end of this connector is closed and provided with a series of slits or openings 54 for the passage of air.

Fig. 12 shows a fragmentary portion of my device in which a stopper 43 is shown in the connector 30. The stopper is used when it is desired to use my invention as a storage means or when it is desired to continue the disinfecting or fumigating effects of the volatile substance which has been previously employed. When the stopper is used, the volatile substance may be permitted to remain in the container 31 or it may be removed if desired. If it is removed, it is obviously a great advantage to be able to remove it from the exterior of the receptacle without having to open the receptacle, which would permit some of the contained vapors to escape. In addition, the ability to insert or remove the chemical agent from the outside of the receptacle has decided labor saving advantages.

The chemical agent which is used in my device may be in the form of lumps or crystals, or even in the form of liquid, in which latter case a suitable absorbent material would be placed within the container 31.

In Fig. 13 I show a receptacle 47 which is generally cylindrical in form. A connector 48 is provided preferably at one end of this receptacle, and a suitable chamber 49 may be secured either to the connector on the inside of the chamber, as shown or it may be placed on the outside thereof in a manner similar to that shown in Fig. 9. The opposite end of the container is provided with a hookless fastener 50 which serves to close the opening 51 at that end. A ring 52 may be provided, whereby the receptacle may be suspended if desired near an open window when it is being used.

When my device is being used, preferably a vacuum cleaner of the household type is employed. When articles are to be disinfected, fumigated, or made moth-proof, they are suspended within the form of device shown in Figs. 1 to 5, inclusive, upon suitable clothes hangers, if their nature permits sush suspension, or if the articles are in the nature of blankets or the like they are just placed within the receptacle, resting on the bottom thereof. An attachment hose 45 is now connected to the blower side 55 of the vacuum cleaner, and the vacuum cleaner is operated. Air will now be drawn into the suction side 56 of the vacuum cleaner and forced through the hose 45 into the receptacle 15. The opening 32 of the receptacle having been substantially closed, there will be a pressure built up within the receptacle which will effectively force the vapor charged air into and through the fabric of the materials or articles being treated.

If it is desired to remove the odor of the fumes or gases, either by means of blowing into or sucking out of the receptacle, it is obvious that the opening 32 may be partially open or closed entirely during either of the steps of operation above described, there being sufficient leakage in the fastener to provide for the necessary passage of air.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. A portable, collapsible, treating device comprising a receptacle formed of flexible material for receiving articles to be treated and provided with an air inlet adapted to be connected to an air pressure supply and also provided with an air outlet, the air inlet being larger in size than the air outlet, whereby pressure will be built up within the receptacle, and means in communication with the receptacle for receiving a volatile substance.

2. A portable, collapsible, treating device comprising a receptacle formed of flexible material adapted to receive articles to be treated, said receptacle being formed with an opening through which the articles to be treated may be inserted and also provided with an air inlet adapted to be connected to the blower side of a vacuum cleaner, and means for charging all of the air flowing toward and into the receptacle with a volatile substance.

3. A treating means for fabrics comprising a portable, collapsible receptacle for receiving articles to be treated, the receptacle being formed of flexible material and having an outlet opening, said receptacle being provided with a connector for attachment to the pressure side of a vacuum cleaner, and means for charging all of the air flowing toward, into, and through the receptacle with a volatile substance, the relative sizes of the inlet and outlet openings being such that a pressure above the atmosphere is built up within the container.

In testimony whereof, I have hereunto signed my name.

ABRAHAM N. SPANEL.